United States Patent
Brück

(10) Patent No.: US 7,111,393 B2
(45) Date of Patent: Sep. 26, 2006

(54) PROCESS FOR PRODUCING A METALLIC HONEYCOMB BODY WITH A RECEPTACLE FOR A SENSOR

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/653,793

(22) Filed: Sep. 3, 2003

(65) Prior Publication Data

US 2004/0074094 A1  Apr. 22, 2004

Related U.S. Application Data

(63) Continuation of application No. PCT/EP02/02123, filed on Feb. 28, 2002.

(30) Foreign Application Priority Data

Mar. 16, 2001  (DE) ................. 101 12 678

(51) Int. Cl.
    *B21D 51/16* (2006.01)
(52) U.S. Cl. ....................... 29/890; 228/181
(58) Field of Classification Search ......... 29/890; 228/181
    See application file for complete search history.

(56) References Cited

U.S. PATENT DOCUMENTS

| | | | |
|---|---|---|---|
| 3,988,890 A | | 11/1976 | Abthoff et al. |
| 4,152,302 A | * | 5/1979 | Nonnenmann et al. ..... 502/338 |
| 5,791,043 A | * | 8/1998 | Okabe et al. ................. 29/890 |
| 5,797,183 A | * | 8/1998 | Humpolik et al. ............ 29/890 |

| | | |
|---|---|---|
| 2002/0061268 A1 | 5/2002 | Brück et al. |

FOREIGN PATENT DOCUMENTS

| | | |
|---|---|---|
| DE | 24 10 417 A1 | 9/1975 |
| DE | 8816154.4 | 3/1989 |
| DE | 199 21 263 A1 | 11/2000 |
| JP | 01012018 * | 4/1987 |
| JP | 63-134061 * | 6/1988 |

(Continued)

OTHER PUBLICATIONS

Stephan Pelters et al.: "Alternative Technologies for Studying Catalyst Behaviour to Meet OBD II Requirements", pp. 1-10.

*Primary Examiner*—Eric Compton
(74) *Attorney, Agent, or Firm*—Laurence A. Greenberg; Werner H. Stemer; Ralph E. Locher

(57) ABSTRACT

A metal honeycomb body that is particularly suited for use in an exhaust system of an internal combustion engine is prepped for receiving a sensor that reaches into the interior of the honeycomb body. First, voids such as recesses and/or elongated holes are formed in at least one sheet metal foil. Then some of the foils are at least partially structured, as for example corrugated. Then the foils are stacked, coiled, wound, or otherwise made into a honeycomb structure, with the at least one sheet metal foil disposed to form a receiver that extends into the interior. The honeycomb structure is then inserting into a sheathing tube that is formed with an opening that is aligned at least partly with the receiver. Then the various pieces are joined by way of a suitable joining technique. The novel method prevents the channels from being damaged during manufacture when receivers for sensors are subsequently produced and allows, for example, an especially effective conversion of exhaust gases.

8 Claims, 3 Drawing Sheets

FOREIGN PATENT DOCUMENTS

JP 01012018 * 1/1989
JP 04-103819 * 4/1992

* cited by examiner

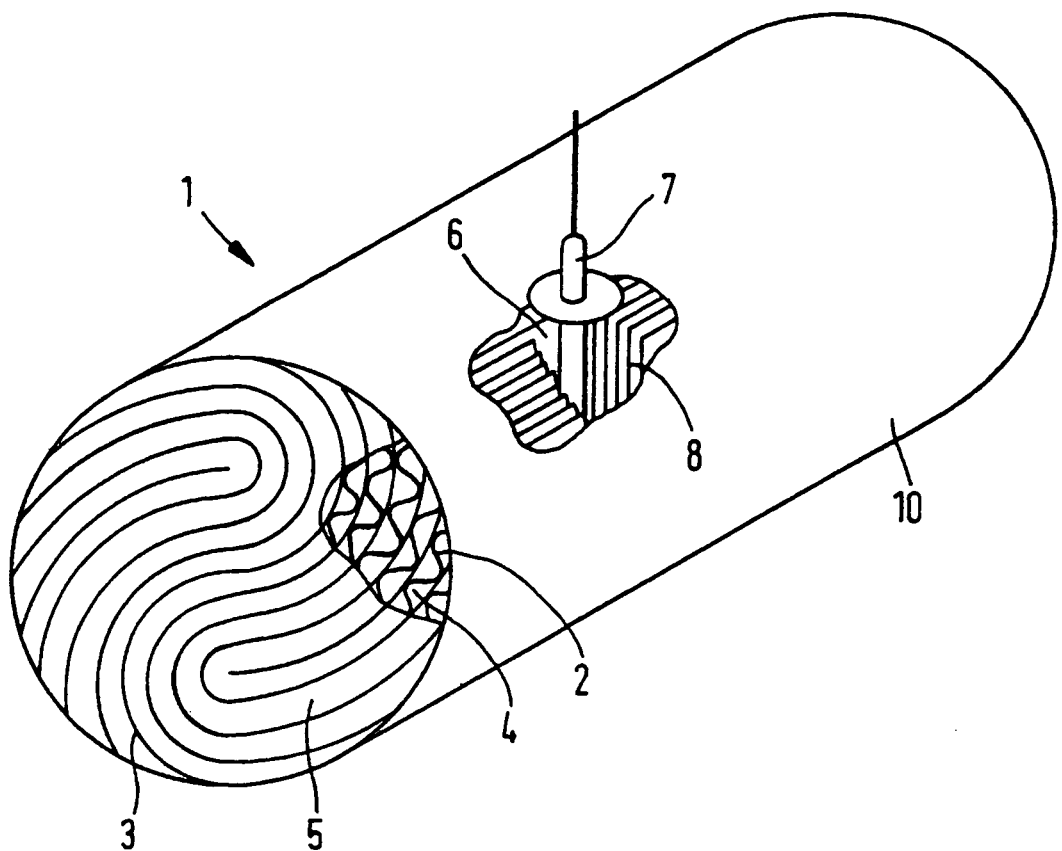
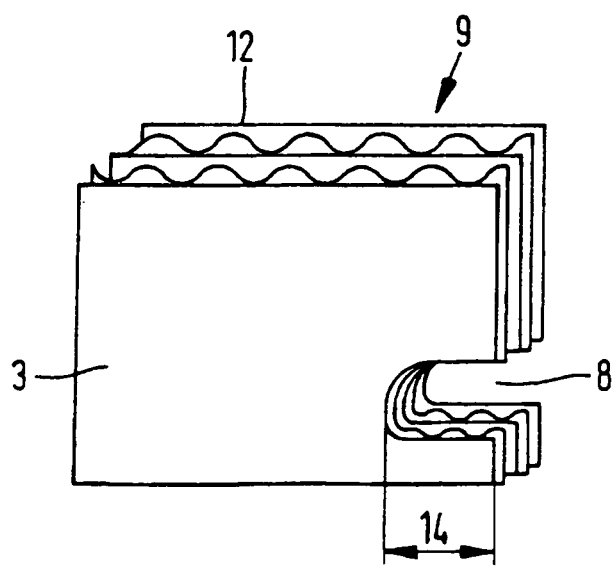

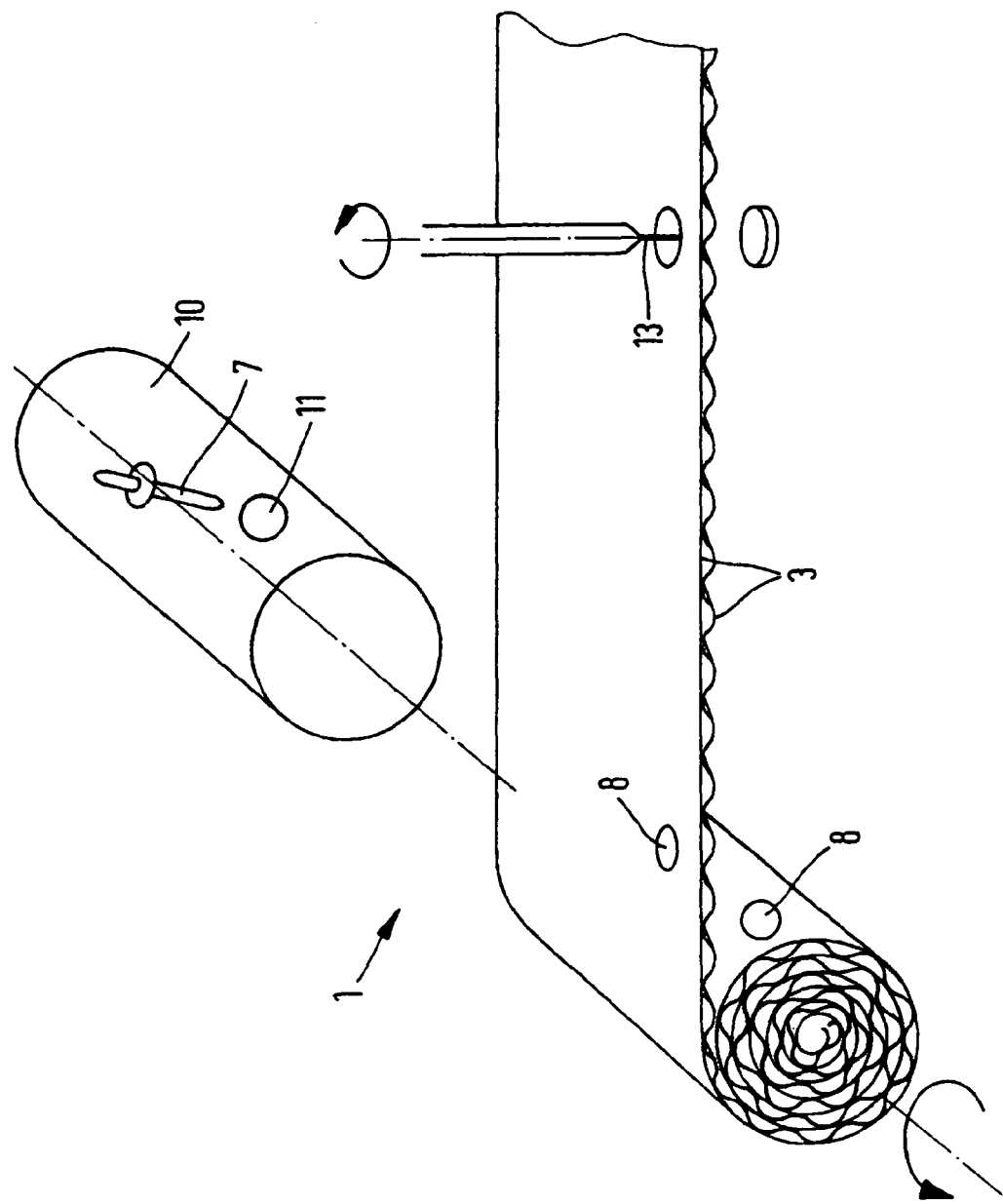

PROCESS FOR PRODUCING A METALLIC HONEYCOMB BODY WITH A RECEPTACLE FOR A SENSOR

CROSS-REFERENCE TO RELATED APPLICATION

This application is a continuation of copending International Application No. PCT/EP02/02123, filed Feb. 28, 2002, which designated the United States and which was not published in English.

BACKGROUND OF THE INVENTION

Field of the Invention

The present invention relates to a process for producing a metallic honeycomb body. The honeycomb comprises at least partially structured metal foils defining passages through which, in particular, an exhaust gas from an internal combustion engine can flow. The metallic honeycomb body has at least one receptacle, which extends into the interior of the honeycomb body, for a sensor.

Honeycomb bodies with sensors of this type are used in particular for onboard diagnostics (OBD), the objective of which is the functional monitoring of catalytic converters for example in an exhaust system of an automobile. In that application, of course, catalytic converters are used to convert pollutants (such as for example nitrogen oxides, unsaturated hydrocarbons, carbon monoxide) contained in the exhaust gas into constituents which can be released into the environment in accordance with the current regulatory and statutory provisions. On account of the fact that direct measurement of, for example, harmful hydrocarbons by means of a sensor does not currently appear possible, there are currently two methods which are used to monitor the functionality of catalytic converters.

The objective of the first method is to determine the level of oxygen stored in the catalytic converter. For that purpose, an oxygen sensor is arranged both upstream and downstream of the catalytic converter. The sensors determine the oxygen content in the exhaust gas. From that information, it is possible to draw conclusions as to the storage capacity of the catalytic converter and/or as to the progress of aging.

The second method uses two thermal sensors, which are arranged directly upstream and downstream of the catalytic converter, to record the change in temperature of the exhaust gas. The gradient is caused by thermal processes inside the catalytic converter, in particular exothermic reactions between the catalytic converter and the exhaust gas.

In addition to configurations with two sensors, one upstream and one downstream, for a catalytic converter of this type, German Utility Model DE 8816154U describes a support body for a catalytic reactor for exhaust gas purification, the honeycomb body of which is composed of a single piece comprising corrugated metal strips. In that case, a sensor is disposed at the support body in such a manner that it extends into the interior of the metal honeycomb body. Furthermore, it is proposed for the opening required for this installation to be produced by way of electron-beam or laser cutting, cavity sinking or high-speed milling and grinding. Producing an opening of this type after the metallic honeycomb body has been formed has proven to be difficult in terms of the manufacturing technology required.

SUMMARY OF THE INVENTION

It is accordingly an object of the invention to provide a method for producing a metallic honeycomb body with a receptacle for a sensor which overcomes the above-mentioned disadvantages of the heretofore-known devices and methods of this general type and which provides for reliable production process that is suitable for series production.

With the foregoing and other objects in view there is provided, in accordance with the invention, a process for producing a metallic honeycomb body, which comprises the following steps:

providing metal foils and forming a void (e.g. recess, bore, oblong hole, etc.) in at least one of the metal foils;
subsequently structuring the metal foils at least partially;
processing the at least partially structured metal foils with a process selected from the group of stacking and winding to form a honeycomb structure with passages for conducting a gas therethrough, and to place the at least one metal foil such that the void defines a receptacle extending into an interior of the honeycomb structure and being configured to receive therein a sensor device;
providing a tubular casing with an opening and introducing the honeycomb structure into the tubular casing, with the opening at least partly aligned with the receptacle; and
connecting the metal foils and the tubular casing with a suitable joining technique.

In a preferred embodiment of the invention, the device is configured to form a honeycomb body for a catalytic converter with passages for an exhaust gas from an internal combustion engine.

In other words, the novel process is designed for producing a metallic honeycomb body comprising at least partially structured metal foils, with passages being formed, through which in particular an exhaust gas from an internal combustion engine can flow, and which has at least one receptacle, which extends into the interior of the honeycomb body, for a sensor. The novel method includes the following steps:

producing voids in at least one metal foil;
stacking and/or winding the metal foils in order to form a honeycomb structure, the at least one metal foil being arranged in such a manner that at least one receptacle which extends into the interior is formed;
introducing the metal foils into a tubular casing having an opening, the opening extending at least partially over the at least one receptacle;
producing a connection, by joining technology, between the individual metal foils and/or between the metal foils and the tubular casing.

The proposed process is distinguished in particular by the fact that essential production processes for forming the receptacle are performed even before the metal foils are structured, such as with a partial corrugation, and before they are stacked and/or wound to form a honeycomb structure. The result of this is that producing recesses of this type affects only the immediately adjoining areas of the at least one metal foil. By contrast, producing a corresponding receptacle using the conventional processes led to the deformation of a large number of adjacent metal foils, since these were already arranged close together. Deformation of this nature led in particular to passages becoming blocked, which in turn caused, for example, the efficiency of a catalytic converter or the pressure loss to be adversely affected. These drawbacks are avoided by the proposed process according to the invention, in which in particular the machining of each individual foil separately is preferred.

In accordance with an added feature of the invention, a receptacle is produced in the form of a blind bore. Accordingly, the voids in the at least one metal foil are to be designed in such a way that after the stacking and/or winding operation they generate a receptacle which extends from the periphery of the honeycomb structure into inner regions. The dimensions of the blind bore are to be selected such that the blind bore is only slightly larger than the sensor which extends into the interior of the honeycomb body. This ensures that, despite a sensor being arranged in the interior of the honeycomb body, a sufficiently large number of passages have a completely continuous wall, providing the surface area required for catalytic conversion of pollutants in the exhaust gas.

According to a further configuration, the metallic honeycomb body has metal foils with a thickness which is less than 0.03 mm. When using such thin foils, subsequent machining (in the stacked and/or wound state) is particularly difficult, meaning that the proposed process is especially suitable for metal foils of this type.

The voids, such as recesses and bores, are produced even before the structure of the metal foils has been generated. It is customary to build up metallic honeycomb bodies using smooth and corrugated metal foils. The corrugated metal foils are introduced into the metal foils using a rolling process. With regard to the production of the recesses, it is advantageous for them to be produced in advance, since it is possible to use relatively simple manufacturing processes. For example, it is possible in particular for the recesses to be stamped or trimmed out of the metal foils. This prevents damage to the structure of the metal foils.

While not preferred in the context of this specification, it is possible for the metal foils to be initially at least partially structured, and then for at least the metal foils which are intended to produce the receptacle to be stacked, the recesses then being produced with the aid of a high-energy beam or jet. This means in particular laser cutting processes, plasma cutting processes and water/abrasive jet cutting processes. In this case, the number of metal foils which are to be stacked and are machined simultaneously should preferably be restricted to 20, in particular 10 or 5 metal foils.

According to yet another configuration of the process, the metal foils are initially stacked and are then wound in an S shape or are arranged in such a way that the metal foils run in an involute form from the inside outwards towards the tubular casing. In this case, the recesses are preferably produced prior to the stacking operation. The S-shaped or involute-shaped arrangement of the metal foils means that they each extend as far as the edge of the honeycomb body or as far as the tubular casing. This has the advantage that it is particularly simple to produce a corresponding recess. To do this, it is sufficient to provide a predeterminable number of adjacent metal foils, as a function of the dimensions of the sensor, with recesses. The recesses directly form the desired receptacle. By contrast, if the metal foils are arranged helically, it is always necessary, during production of the recesses, to take account of the change in circumference, so that the recess of the wound metal layer is arranged over the recess of the previous metal layer.

The recesses are in this case preferably U-shaped, with in particular adjacent metal foils having different depths. The U-shaped configuration of the recesses in particular allows the use of sensors in rod form. The slightly curved arrangement of the metal foils in the vicinity of the tubular casing is taken into account with the aid of preferably slight variations in the depth of the recesses in adjacent metal foils, this also, for example, ensuring the integration of sensors in rod form without the sensors making contact with the metal foils.

According to an advantageous configuration of the process, the receptacle is designed in such a way that at least in sections it follows a profile of the metal foils. The result of this is that only a relatively small amount of adjacent metal foils have to be provided with recesses. In this case, the sensor to be used is preferably designed to match the profile of the metal foils. This prevents damage to the metal foils, while having only a very slight influence on the functionality of the honeycomb structure.

Other features which are considered as characteristic for the invention are set forth in the appended claims.

Although the invention is illustrated and described herein as embodied in a process for producing a metallic honeycomb body with receptacle for a sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic and perspective view of a metallic honeycomb body having a sensor;

FIG. 2 is a diagrammatic and perspective view of an assembly of metal foils formed with recesses;

FIG. 3 is a diagrammatic and perspective view of the sequence of one configuration of the process according to the invention;

DESCRIPTION OF THE PREFERRED EMBODIMENTS

Figure 4:
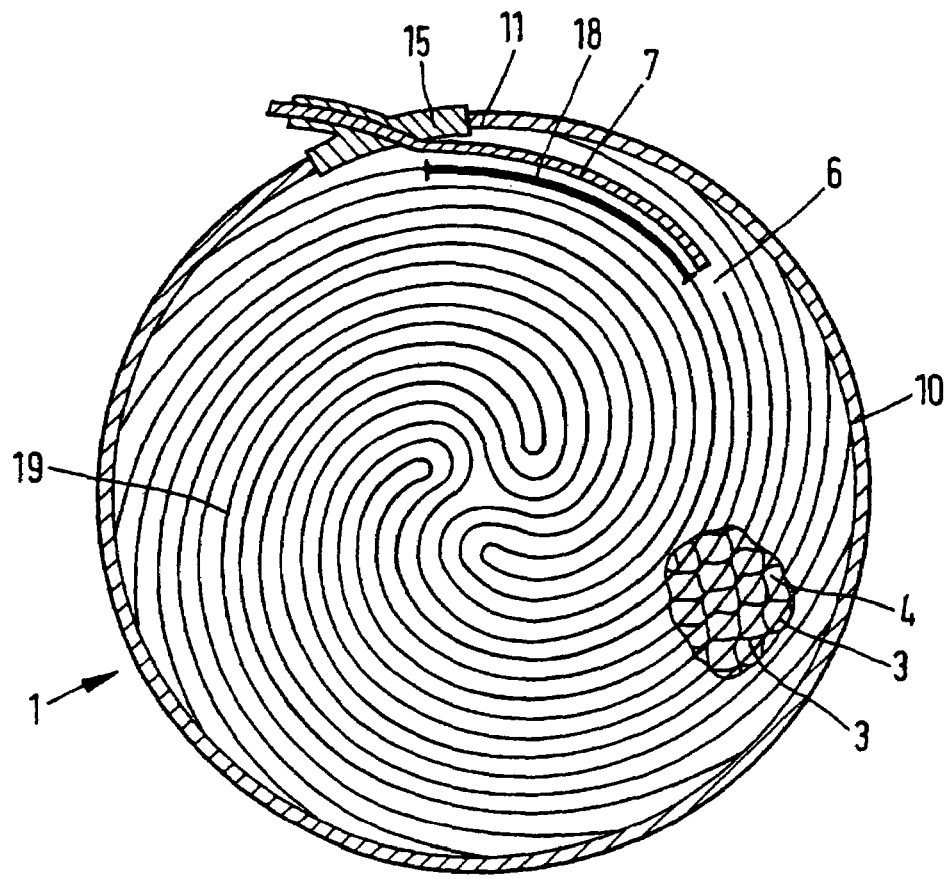
FIG. 4 is a diagrammatic view of a cross section through an embodiment of a metallic honeycomb body with metal foils running in involute form.

Referring now to the figures of the drawing in detail and first, particularly, to FIG. 1 thereof, there is shown a metallic honeycomb body 1 formed with layers of metal foil 3 which at least in part are formed with structures 2 that define passages 4. A metallic honeycomb body 1 of this type is used in particular to purify exhaust gases from an internal combustion engine. The exhaust gas to be purified flows through the passages 4 in the honeycomb body 1. The honeycomb body 1 has a receptacle 6 which extends into the interior 5 of the honeycomb body 1 and in which a sensor 7 is disposed. The receptacle 6 is formed by a number of recesses or openings 8, generally referred to as voids, which have been formed into a suitable number of the metal foils 3. The metal foils 3 are in this case wound in an S shape and surrounded by a tubular casing 10.

FIG. 2 shows a stack of smooth and corrugated metal foils which together form a honeycomb structure 9. The metal foils 3 have a thickness 12 of preferably less than 0.03 mm. A stack of this type is then wound, for example, into the S-shape honeycomb illustrated in FIG. 1. In order, in the process, by way of example, to produce a receptacle 6 as shown in FIG. 1, some metal sheets have recesses 8 with a predetermined depth 14 starting from the edge of the metal foils which subsequently bears against the tubular casing 10. The depth 14 of the recesses 8 in adjacent metal foils 3 is in this case preferably different. In this context, it is advantageous for the metal foils to be machined individually using a cutting process.

FIG. 3 diagrammatically depicts the sequence involved in producing a metallic honeycomb body 1 that is helically wound from the metal foils 3. In this case, a smooth metal foil 3, i.e., a flat sheet, and a structured metal foil 3, such as a corrugated foil, are placed on top of one another and the recesses or openings 8 are produced with the aid of a high-energy beam or jet 13. In the process, by way of example, a nozzle is moved over the metal foils 3 (as indicated by an arrow) in accordance with the desired shape of the recess or opening 8, in order to produce, for example, round openings 8 with the aid of the water jet/abrasive jet cutting process. The metal foils 3 which have been treated in this way are wound up to form a honeycomb structure, with the distances between the adjacent openings 8 being defined in such a manner that they always overlap one another during the winding operation. When the honeycomb structure has reached a predetermined diameter, the supply of metal foils 3 are severed and the honeycomb structured is introduced into a tubular casing 10 or jacket. The tubular casing 10 has an opening 11 which is oriented in such a way that it is arranged at least partially above the openings 8. In this way, a receptacle 6 is formed, in which a sensor 7 can subsequently be placed.

After the stacked and/or wound honeycomb structure 9 has been introduced into the tubular casing 10 the various parts are joined to one another, i.e., the foils are joined to one another at suitable locations and/or the foils at joined to the tubular casing 10. The preferred manner of producing this technical joining connection is by brazing. However, a sintering process or even welding may be used as well.

FIG. 4 diagrammatically depicts a cross section through an embodiment of a metallic honeycomb body 1 with metal foils 3, with the structure 2 in this case having been disregarded. The metal foils 3 are in this case arranged in a tubular casing 10, forming an involute profile 19. The receptacle 6 formed by the metal foils 3 in this case, in a section 18, follows the profile 19, as does a sensor 7 which has been arranged in the receptacle 6 and is shaped suitably. The sensor 7 is in this case fixed in the opening 11 in the tubular casing 10 by means of a holder 15. The sensor 7 is of at least partially elastic or deformable design, in order to facilitate the introduction of the sensor 7 into the receptacle 6. The number of the metal foils 3 with recesses or openings 8 is in this way limited to less than 20, in particular less than 10.

Figure 5:
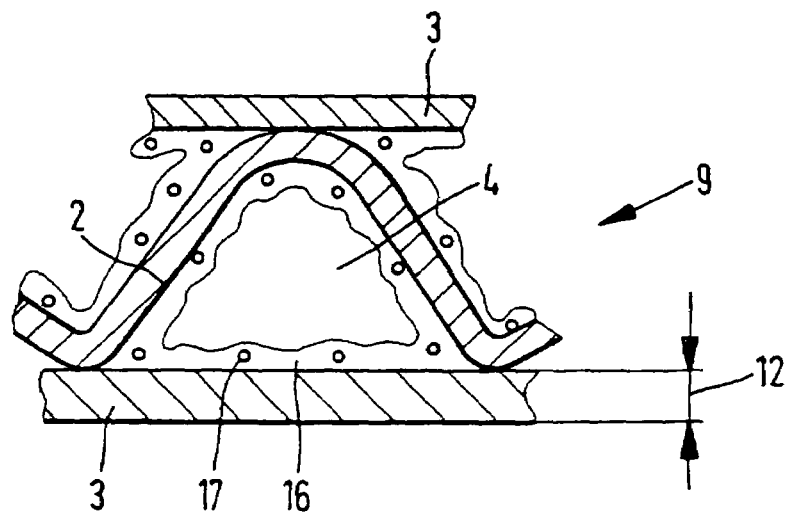
FIG. 5 is a highly enlarged diagrammatic view of a detail of a coated honeycomb structure.

FIG. 5 diagrammatically depicts a detailed view of a coated honeycomb structure 9. The passages 4 of the honeycomb structure 9 are delimited by the metal foils 3, with a metal foil 3 with a structure 2 and a smooth metal foil 3 being wound alternately. The metal foils in this case have a thickness 12 of less than 0.03 mm. In view of the preferred use of honeycomb bodies of this type as catalyst carrier bodies for exhaust gas purification, the honeycomb structure 9 illustrated has a catalytically active coating 16. During the purification process, the coating 16 comes into contact with the exhaust gas flowing through the passages 4. The precious metal 17 included in the coating 16 thereby catalyzes the conversion of the pollutants.

The process according to the invention prevents manufacturing damage to passages during the retrospective production of receptacles for sensors and thereby ensures, for example, particularly effective conversion of exhaust gases.

I claim:

1. A process for producing a metallic honeycomb body, which comprises the following steps:
    providing metal foils and forming a void in at least one of the metal foils;
    forming voids in adjacent metal foils with mutually different dimensions;
    subsequently forming the metal foils for at least partially providing structures on the metal foils;
    processing the at least partially structured metal foils by stacking and subsequently winding the metal foils in an S shape or arranging the metal foils to run in an involute form from an inside outward, to form a honeycomb structure with passages defined by the structures on the metal foils for conducting a gas therethrough, and to place the at least one metal foil such that the void defines a receptacle extending into an interior of the honeycomb structure and being configured to receive therein a sensor device;
    providing a tubular casing with an opening and introducing the honeycomb structure into the tubular casing, with the opening at least partly aligned with the receptacle;
    connecting the metal foils and the tubular casing with a suitable joining technique; and
    integrating a sensor in rod form into the receptacle without the sensor making contact with the metal foils.

2. The process according to claim 1, which comprises forming the at least partially structured metal foils to form a honeycomb body for a catalytic converter forming passages for an exhaust gas from an internal combustion engine.

3. The process according to claim 1, which comprises forming the receptacle to define a blind bore.

4. The process according to claim 1, wherein the metal foils have a thickness of less than 0.03 mm.

5. The process according to claim 1, which comprises stamping the voids from the metal foils.

6. The process according to claim 1, wherein the voids are U-shaped recesses.

7. The process according to claim 1, which comprises forming the receptacle, at least in sections thereof, to follow a profile of the metal foils.

8. The process according to claim 7, which comprises inserting a sensor having a shape corresponding to a shape of the receptacle.

* * * * *